United States Patent
Kong et al.

(10) Patent No.: US 10,162,354 B2
(45) Date of Patent: Dec. 25, 2018

(54) CONTROLLING ERROR CORRECTED PLANNING METHODS FOR OPERATING AUTONOMOUS VEHICLES

(71) Applicant: Baidu USA LLC, Sunnyvale, CA (US)

(72) Inventors: Qi Kong, Sunnyvale, CA (US); Fan Zhu, Sunnyvale, CA (US); Dong Li, Sunnyvale, CA (US); Yifei Jiang, Sunnyvale, CA (US); Li Zhuang, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 133 days.

(21) Appl. No.: 15/216,566

(22) Filed: Jul. 21, 2016

(65) Prior Publication Data

US 2018/0024553 A1   Jan. 25, 2018

(51) Int. Cl.
*G05D 1/00* (2006.01)
*G01C 22/00* (2006.01)
(Continued)

(52) U.S. Cl.
CPC ........... *G05D 1/0088* (2013.01); *B60W 30/09* (2013.01); *G05D 1/027* (2013.01); *G05D 1/0212* (2013.01); *G05D 1/0248* (2013.01); *G05D 1/0257* (2013.01); *G05D 1/0278* (2013.01); *G08G 1/096827* (2013.01); *G08G 1/096844* (2013.01); *B60W 2420/54* (2013.01); *B60W 2540/18* (2013.01); *B60W 2550/402* (2013.01); *G05D 2201/0212* (2013.01); *G05D 2201/0213* (2013.01)

(58) Field of Classification Search
CPC combination set(s) only.
See application file for complete search history.

(56) References Cited

U.S. PATENT DOCUMENTS 5,122,957 A * 6/1992 Hattori ................ G05D 1/0221
382/153
6,707,421 B1 * 3/2004 Drury .................... G01C 21/34
342/357.31
(Continued)

FOREIGN PATENT DOCUMENTS

WO       2015/134376 A1    9/2015

*Primary Examiner* — Khoi H Tran
*Assistant Examiner* — Jorge O Peche
(74) *Attorney, Agent, or Firm* — Womble Bond Dickinson (US) LLP

(57) ABSTRACT

In one embodiment, motion planning and control data is received, indicating that an autonomous vehicle is to move from a first point to a second point of a path. The motion planning and control data describes a plurality of routes from the first point to the second point within the path. For each of the routes, a simulation of the route is performed in view of physical characteristics of the autonomous vehicle to generate a simulated route. A controlling error is calculated, the controlling error representing a discrepancy between the route and the simulated route. One of the routes is selected based on controlling errors between the routes and associated simulated routes. The autonomous vehicle is operated to move from the first point to the second point according to the selected route.

15 Claims, 7 Drawing Sheets

(51) Int. Cl.
   *B60W 30/09* (2012.01)
   *G05D 1/02* (2006.01)
   *G08G 1/0968* (2006.01)

(56) References Cited

U.S. PATENT DOCUMENTS

| | | | | |
|---|---|---|---|---|
| 8,050,863 B2* | 11/2011 | Trepagnier | ............ | B60W 30/00 180/167 |
| 8,126,642 B2* | 2/2012 | Trepagnier | ............ | G01S 17/023 701/423 |
| 8,788,121 B2* | 7/2014 | Klinger | .................. | G05D 1/104 701/3 |
| 9,104,537 B1* | 8/2015 | Penilla | ..................... | G06F 17/00 |
| 9,158,797 B2* | 10/2015 | Stanfill | ...................... | G06F 8/51 |
| 9,665,100 B2* | 5/2017 | Shashua | ................. | G01C 21/32 |
| 9,678,508 B2* | 6/2017 | Cima | ................... | G05D 1/0088 |
| 9,690,293 B2* | 6/2017 | Shashua | ................. | G01C 21/32 |
| 9,696,719 B2* | 7/2017 | Aviel | ................... | G01C 21/32 |
| 9,709,986 B2* | 7/2017 | Gdalyahu | .............. | G01C 21/32 |
| 9,760,090 B2* | 9/2017 | Shashua | ................. | G01C 21/32 |
| 9,764,736 B2* | 9/2017 | Prokhorov | ......... | B60W 30/0953 |
| 9,817,399 B2* | 11/2017 | Braunstein | ............ | G01C 21/32 |
| 9,873,427 B2* | 1/2018 | Danzl | ................... | B60K 28/06 |
| 9,880,555 B2* | 1/2018 | Lynch | ................... | G01C 21/30 |
| 9,911,346 B2* | 3/2018 | Klinger | ................ | G05D 1/0214 |
| 2002/0099481 A1* | 7/2002 | Mori | ...................... | G01C 21/12 701/23 |
| 2003/0018428 A1* | 1/2003 | Knockeart | ......... | G01C 21/3415 342/357.31 |
| 2005/0004723 A1* | 1/2005 | Duggan | ............... | G05D 1/0061 701/24 |
| 2008/0195282 A1* | 8/2008 | Norris | ..................... | B62D 1/28 701/44 |
| 2012/0179322 A1* | 7/2012 | Hennessy | ............ | G05D 1/0278 701/25 |
| 2013/0211656 A1* | 8/2013 | An | ........................ | G05D 1/0221 701/25 |
| 2013/0218396 A1* | 8/2013 | Moshchuk | ............ | B60W 50/08 701/25 |
| 2014/0288759 A1* | 9/2014 | Cima | ................... | G05D 1/0088 701/25 |
| 2014/0309836 A1* | 10/2014 | Ollis | ........................ | G08G 1/22 701/25 |
| 2015/0006005 A1* | 1/2015 | Yu | .......................... | G06Q 10/08 701/22 |
| 2016/0091897 A1* | 3/2016 | Nilsson | ................ | G05D 1/0212 701/25 |
| 2016/0178381 A1* | 6/2016 | Lynch | .................... | G01C 21/30 701/23 |
| 2016/0200317 A1* | 7/2016 | Danzl | .................... | B60K 28/06 701/25 |
| 2016/0375901 A1* | 12/2016 | Di Cairano | ........... | B60W 30/09 701/26 |
| 2017/0008521 A1* | 1/2017 | Braunstein | ............ | G01C 21/32 |
| 2017/0043768 A1* | 2/2017 | Prokhorov | ........ | B60W 30/0953 |
| 2017/0158197 A1* | 6/2017 | Johnson | ................ | B60W 10/18 |
| 2017/0168504 A1* | 6/2017 | Darms | ................... | G01C 21/00 |
| 2017/0227962 A1* | 8/2017 | Cesarano | ............ | G05D 1/0214 |
| 2017/0227968 A1* | 8/2017 | Klinger | ................ | G05D 1/0214 |
| 2017/0229029 A1* | 8/2017 | Klinger | ................ | G05D 1/0214 |
| 2017/0248960 A1* | 8/2017 | Shashua | ................. | G01C 21/32 |
| 2017/0322042 A1* | 11/2017 | Yoon | ................... | G01C 21/3407 |
| 2017/0336792 A1* | 11/2017 | Gdalyahu | .............. | G01C 21/32 |
| 2017/0336793 A1* | 11/2017 | Shashua | ................. | G01C 21/32 |
| 2017/0336794 A1* | 11/2017 | Shashua | ................. | G01C 21/32 |
| 2017/0336801 A1* | 11/2017 | Shashua | ................. | G01C 21/32 |
| 2017/0357262 A1* | 12/2017 | Dix | ........................ | G01S 19/13 |

* cited by examiner

CONTROLLING ERROR CORRECTED PLANNING METHODS FOR OPERATING AUTONOMOUS VEHICLES

FIELD OF THE INVENTION

Embodiments of the present invention relate generally to operating autonomous vehicles. More particularly, embodiments of the invention relate to controlling error corrected planning methods for operating autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features or limitations for different types of vehicles. Same motion planning and control are applied to all types of vehicles, which may not be accurate and smooth under some circumstances.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
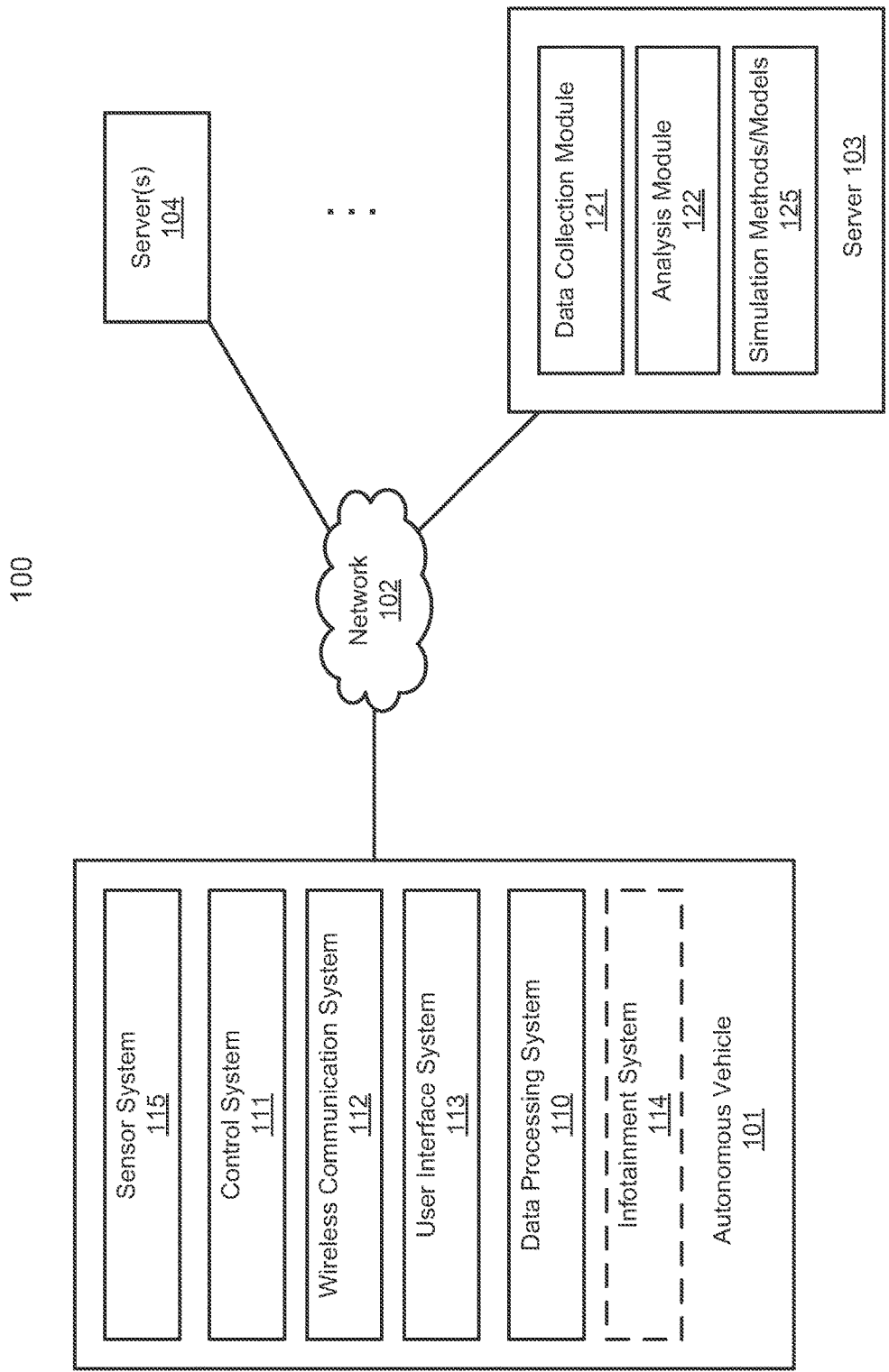
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is utilized to estimate controlling errors of a route planned by a planning system of an autonomous vehicle in view of the physical driving characteristics of a particular vehicle in question. In one embodiment, in view of the planning and control information associated with each of one or more routes of a path provided by a planning module, a simulation is performed to generate a simulated route for each of the routes based on the physical features and/or limitations of the corresponding vehicle. The simulated route is compared with each of the planned routes to determine a controlling error between the simulated route and the planned route. The controlling errors are utilized to select one of the planned routes that has the smallest controlling error for driving the vehicle. As a result, the selected route is closest to a route a particular human driver would drive the same type of vehicles given a set of physical features and/or limitations of that particular type of the vehicles. That will reduce the possibility of a situation in which a planned route cannot be performed by a vehicle due to its physical features or limitations (e.g., minimum turning radius) or the planned route is not smooth or is uncomfortable to a passenger.

In one embodiment, motion planning and control data is received indicating that an autonomous vehicle is to move from a first point to a second point of a path. The motion planning and control data includes information describing one or more routes from the first point to the second point within the path. For each of the routes, a simulation is performed to generate a simulated route based on the planning and control data of the route in view of physical characteristics of the autonomous vehicle. The physical characteristics of the vehicle may be obtained from a vehicle profile of the same or a similar type or model of vehicles. The physical characteristics (also referred to as driving features or driving limitations) of a vehicle may include, but are not limited to, a minimum turning radius, an acceleration time for a predetermined distance, a deceleration time for a predetermined distance, and physical dimension (e.g., height, width, and weight) of the vehicle, etc.

For each of the routes, a controlling error is computed between the route and the corresponding simulated route. In one embodiment, a curve or graph of each route is plotted against a curve or graph of the simulated route to determine the maximum difference between each route and the simulated route at different points in time, particularly at the curvature points. The maximum difference is utilized as part of a controlling error for that particular route. One of the routes is then selected based on the controlling errors of the routes, such as the minimum or smallest controlling error. The autonomous vehicle is then operated according to the selected route.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (POI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, data processing system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or data processing system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
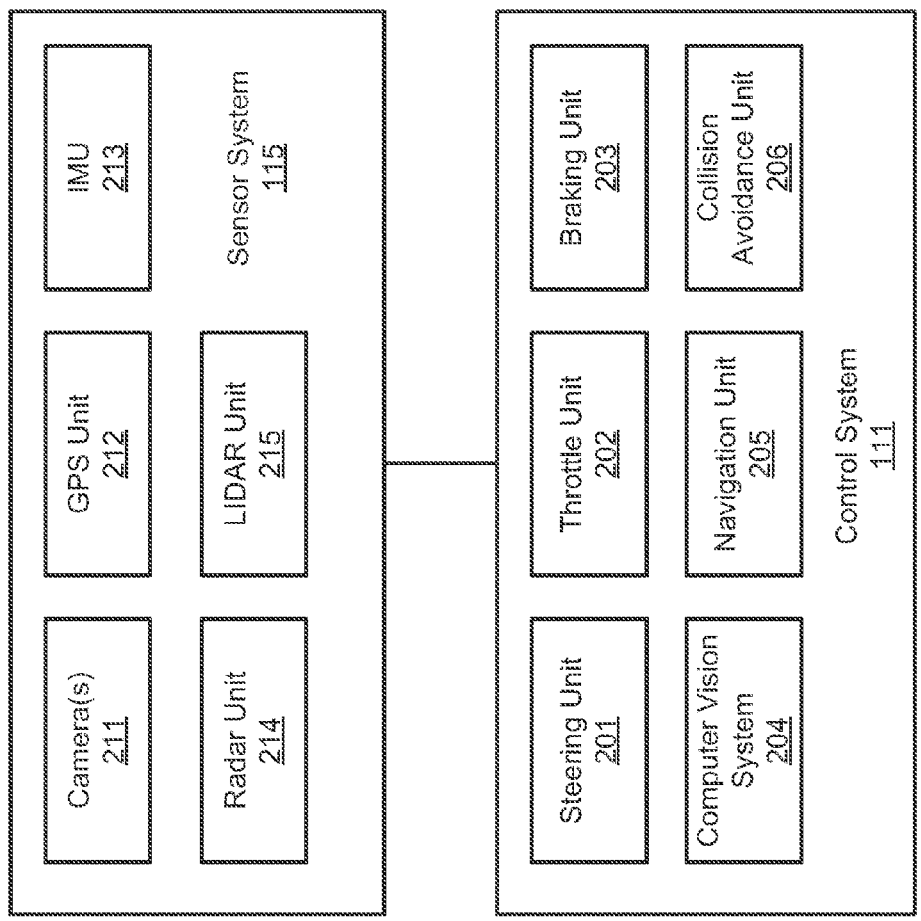
FIG. 2 is a block diagram illustrating an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), braking unit 203, computer vision system 204, navigation unit 205 (also referred to as a navigation and pathing or navigation/pathing system), and collision avoidance unit 206 (also referred to as an obstacle avoidance system). Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Computer vision unit or system 204 is to process and analyze images captured by one or more cameras 211 in order to identify objects and/or features in the environment of autonomous vehicle. The objects can include traffic signals, road way boundaries, other vehicles, pedestrians, and/or obstacles, etc. Computer vision system 204 may use an object recognition algorithm, video tracking, and other computer vision techniques. In some embodiments, computer vision system 204 can map an environment, track objects, and estimate the speed of objects, etc.

Navigation unit or system 205 is to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via a user interface. Navigation system 205 may update the driving path dynamically while the autonomous vehicle is in operation. Navigation system 205 can incorporate data from a GPS system and one or more maps so as to determine the driving path for the autonomous vehicle.

Collision avoidance unit or system 206 is to identify, evaluate, and avoid or otherwise negotiate potential obstacles in the environment of the autonomous vehicle. For example, collision avoidance system 206 may effect changes in the navigation of the autonomous vehicle by operating one or more subsystems in the control system to undertake swerving maneuvers, turning maneuvers, braking maneuvers, etc. Collision avoidance system 206 may automatically determine feasible obstacle avoidance maneuvers on the basis of surrounding traffic patterns, road conditions, etc. Collision avoidance system 206 may be configured such that a swerving maneuver is not undertaken when other sensor systems detect vehicles, construction barriers, etc. in the region adjacent the autonomous vehicle that would be swerved into. Collision avoidance system 206 may automatically select the maneuver that is both available and maximizes safety of occupants of the autonomous vehicle. Collision avoidance system 206 may select an avoidance maneuver predicted to cause the least amount of acceleration in a passenger cabin of the autonomous vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some of all of the functions of autonomous vehicle 101 may be controlled or managed by data processing system 110, especially when operating in an autonomous driving mode. Data processing system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, data processing system 110 may be integrated with vehicle control system 111.

For example, a user as a passenger may specify a starting location and a destination of a trip, for example, via a user interface. Data processing system 110 communicates with other components of autonomous vehicle 101 to obtain the trip related data. For example, data processing system 110 may obtain location and route information from a location server and a map and point of interest (MPOI) server, which may be a part of servers 103-104. The location server provides location services and MPOI server 105 provides map services and the POIs of certain locations. Alternatively, such location and MPOI information may be cached locally in a persistent storage device of data processing system 110.

During traveling of autonomous vehicle 101 along the route, data processing system 110 may also obtain real-time traffic information from a traffic information system or server (TIS). Note that servers 103-104 may be operated by a third party entity. Alternatively, the functionalities of servers 103-104 may be integrated with data processing system 110. Based on the real-time traffic information, MPOI information, and location information, as well as real-time local environment data detected or sensed by sensor system 115 (e.g., obstacles, objects, nearby vehicles), data processing system 110 can plan an optimal route and drive vehicle 101, for example, via control system 111, according to the planned route to reach the specified destination safely and efficiently.

According to one embodiment, autonomous vehicle 101 may further include infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

In an autonomous vehicle, there may be no actual or physical window. Rather, a "window" (referred to herein as a virtual window) may be represented or replaced by a display device, i.e., a flat or curved screen display device molded into a shape of a vehicle window, optionally with a touch screen. The display device would display images or stream of images (e.g., video) that are captured dynamically in real-time by an appropriate camera or cameras, as if the user were watching or viewing the actual physical content through a see-through window. For each of the "windows" (e.g., display devices), there is a corresponding display channel to stream the corresponding content to be displayed at real-time, which may be centrally processed by an augmenting reality system, e.g., infotainment system 114 and/or data processing system 110. In such situation, an augmented image is displayed in a virtual reality manner via infotainment system 114, also referred to as an augmented reality manner.

For example, a content item received from a content database or from a remote content provider or content server may be superimposed onto an image captured locally by a camera to become an augmented image. The augmented image is then displayed on a display device within autonomous vehicle 101. The display device may be configured to appear as an ordinary window of a vehicle. When a user looks at the display device, the object of the image is displayed as a virtual object in a virtual reality manner as if the user looked at the physical object through an ordinary window of the vehicle. The display device may display a stream of augmented images (e.g., augmented video) in real time, which is similar or simulates an augmented reality (AR) environment.

In one embodiment, based on location and route information, MPOI information, and/or real-time traffic information, infotainment system 114 and/or data processing system 110 determines certain types of content that are suitable for the current traffic environment (e.g., MPOIs). The system performs a lookup operation in a content index (not shown) to identify a list content items (e.g., sponsored content or Ads) as content item candidates, for example, based on the real-time traveling information.

In one embodiment, the system ranks the content items in the list using a variety of ranking algorithm. The content items may be ranked based on a user profile of the user. For example, the content items may be ranked based on user preferences, which may be derived from the user profile. The user profile may be compiled based on a history of user operations of the user in the past. In one embodiment, the system applies one or more content ranking models to each of the content items to determine a ranking score for each content item. A content item having a ranking score that is above a predetermined threshold may be selected. The content ranking models may be trained using sets of known features representing similar traveling environments or traffic conditions in the past. The content ranking models may also be trained based on user profiles of similar users.

The selected content item is then rendered and displayed on a display device within the autonomous vehicle. In one embodiment, the system further augments the selected content item onto an image that is captured at the point in time using one or more cameras of the autonomous vehicle. In one embodiment, an image recognition is performed on the image and to derive or understanding the content represented by the image. For example, one or more keywords may be derived to describe the image or a POI. The list of content items may be identified further based on the one or more keywords or the POI represented by the image. The system then augments the selected content item onto the image generate an augmented image, where the content item may be superimposed on the image. The augmented image is then displayed on a display device of the autonomous vehicle. Note that infotainment system 114 may be integrated with data processing system 110 according to some embodiments.

Alternatively, a user can specifically select from a list of precompiled content (e.g., videos, movies) from a content store or database, which may be periodically updated from a content server of a content provider over a network (e.g., cloud network). Thus, a user can specifically select the real-time actual content captured in real-time or previously rendered content to be displayed on the display device(s), for example, retrieved from data store 125. For example, if autonomous vehicle 101 is traveling in a snowy day in New York City, the user can switch the display devices to display a sunny environment in Hawaii as if autonomous vehicle 101 was traveling on a sunny day. The content may displayed in multiple display devices (e.g., multiple windows) in a collaborated or coordinated manner, i.e., virtual reality manner.

According to one embodiment, data processing system 110 includes a route simulation system (not shown) to estimate controlling errors of a route planned by a planning system of autonomous vehicle 101 in view of the physical driving characteristics of autonomous vehicle 101. In one embodiment, in view of the planning and control information associated with one or more routes of a path provided by a planning module, the route simulation system performs a simulation to generate a simulated route for each of the routes associated with the path based on the physical features and/or limitations of autonomous vehicle 101. The simulation may be performed based on a simulation method or simulation model, which may be generated and provided by a data analytics system such as server 103. The simulation method or model may be generated based on a large amount of driving data of a large amount of vehicle of the same or similar type driven by a large amount of human drivers. The driving data may be collected by data collection module 121 and analyzed by analysis module 122 to generate simulation methods or models 125 for a variety of types of vehicles.

A simulated route is compared with a corresponding one of the planned routes to determine a controlling error between the simulated route and the planned route. The controlling errors are utilized to select one of the planned routes that has the smallest controlling error for driving autonomous vehicle 101. As a result, the selected route is closest to a route a particular human driver would drive the same type of vehicles as of autonomous vehicle 101 given a set of physical features and/or limitations of that particular type of the vehicles. That will reduce the possibility of a situation in which a planned route cannot be performed by a vehicle due to the physical features or limitations (e.g., minimum turning radius) or the planned route is not smooth or is uncomfortable to a passenger.

Figure 3:
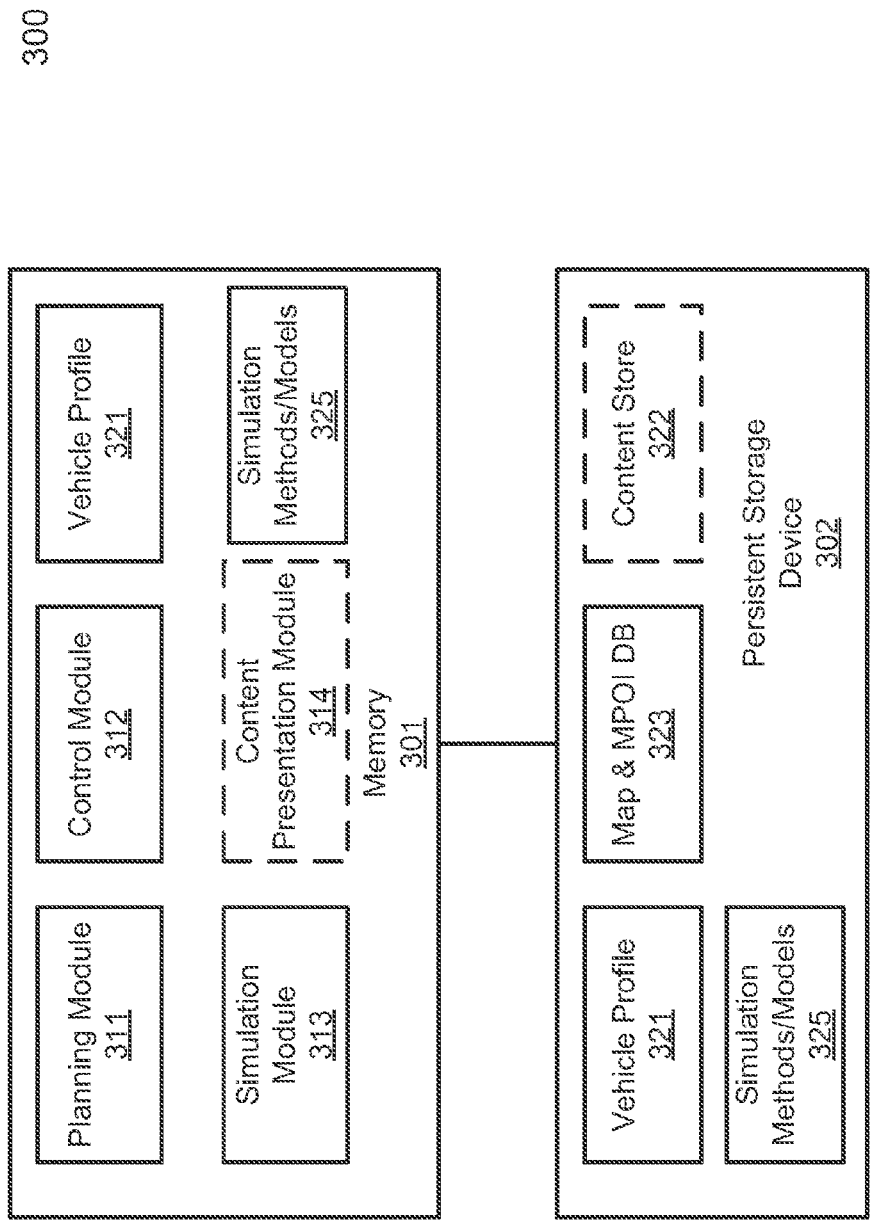
FIG. 3 is a block diagram illustrating an example of a data processing system which may be utilized with an autonomous vehicle according to one embodiment of the invention.

FIG. 3 is a block diagram illustrating an example of a data processing system which may be utilized with an autonomous vehicle according to one embodiment of the invention. System 300 may be implemented as part of data processing system 110 of FIG. 1. Referring to FIG. 3, system 300 includes, but is not limited to, planning module 311, control module 312, simulation module 313, and optional content presentation module 314. Modules 311-314 may be implemented in software, hardware, or a combination thereof. In one embodiment, modules 311-314 may be installed and stored in persistent storage device 302, loaded into system memory 301, and executed by one or more processors (not shown). Content presentation module 314 may be coupled to or implemented as part of infotainment system 114 of FIG. 1 to provide infotainment information to passengers of the vehicle based on content stored in content store 322 or content streamed in real-time from a remote content server over a network.

Planning module 311 is to plan a path or route for the autonomous vehicle based on a variety of information, such as, sensor data received from sensor system 115 and/or real-time information received from a variety of sources (e.g., location, map, POI as part of map and point of interest or MPOI database 323). The planning and control data is generated by planning module 311. Based on the planning and control data control module 312 is to control the vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route. Note that planning module 311 and control module 312 may be communicatively coupled to or integrated with navigation unit 205 of vehicle control system 111 of FIG. 2.

According to one embodiment, when the planning and control data of a path along a route is generated by planning module 311, the planning and control data describes a set of one or more routes from a first point (e.g., a starting point) to a second point (e.g., an ending point or destination point) of a path or path segment of a path. Different routes may have different driving parameters such as speeds, acceleration, turning angles at different points of time along the corresponding route.

In response to the planning and control data provided by planning module 311, control module 312 invokes simulation module 313 to perform a simulation based on vehicle profile 321 for each of the planned routes. According to one embodiment, simulation module 313 performs a simulation based on the route information as part of the planning and control data of a planned route and the physical characteristics (e.g., features and/or driving limitations) of the vehicle obtained from vehicle profile 321 of the vehicle, using one or more of simulation methods or models 325. Vehicle profile 321 and simulation methods/models 325 may be previously compiled, for example, by data analytics system 103 and stored in persistent storage device 302.

Vehicle profile 321 may be specifically compiled for a specific type or model of vehicles. Vehicle profile 321 may include certain physical and driving characteristics of the vehicle, such as, for example, a minimum turning radius, acceleration, braking, a physical dimension (e.g., height, width, weight, wheel size or diameter, wheel base), and engine or horse power, etc. A minimum turning radius refers to the radius of the smallest circular turn (i.e., U-turn) that a vehicle is capable of making. The acceleration parameter refers to the time or distance that a vehicle can accelerate from a zero speed to a predetermined speed (e.g., 60 mile per hour or mph). The braking parameter refers to the time or distance that a vehicle can decelerate from a predetermined speed (e.g., 60 mph) to zero.

In one embodiment, a simulated route is generated based on the planning and control data of a particular planned in view of vehicle profile 321. Control module 312 and/or simulation module 313 compare the simulated route with the corresponding planned route generated by planning module 311. For each of the routes, a controlling error is determined based on the comparison. The controlling error represents a difference between the corresponding route and the corresponding simulated route. In one embodiment, a curve or graph of the route and the simulated route may be plotted and the difference between two graphs is determined at different points in time. The maximum difference may be utilized as a controlling error between two routes. A larger controlling error indicates that the vehicle more likely have a difficulty or unsmooth driving according to the corresponding planned route. Based on the controlling errors associated with the planned routes, one of the planned routes is then selected, where the selected route may have the smallest or minimum controlling error amongst the controlling errors of all routes. In one embodiment, control module 312 provides a feedback (e.g., controlling errors) to planning module 311 to allow planning module 311 to select one of the planned routes. Planning module 311 may select the best route based on other features such as route curvature, speed, etc., in addition to the controlling errors. The vehicle is then operated according to the selected route.

Figure 4:
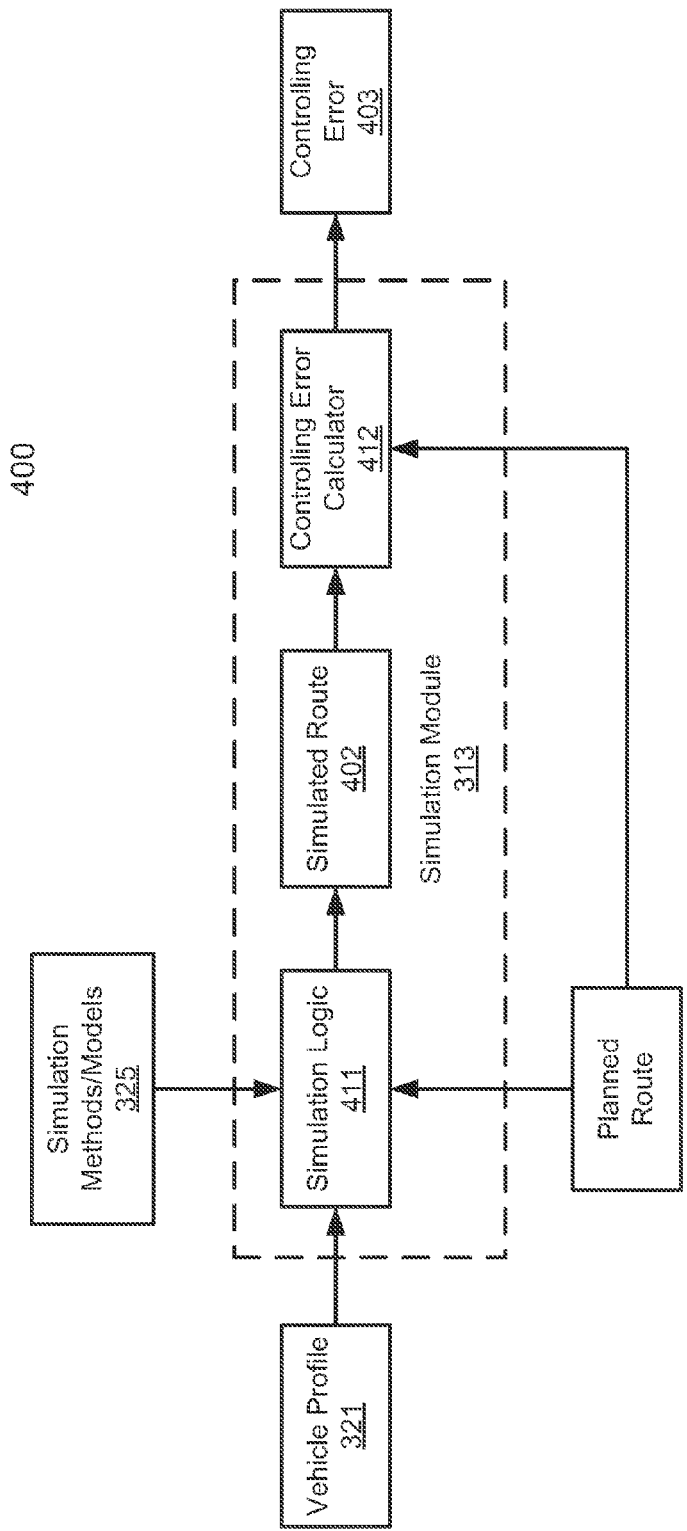
FIG. 4 is a processing flow for simulating a route of an autonomous vehicle according to one embodiment of the invention.

FIG. 4 is a processing flow for simulating a route of an autonomous vehicle according to one embodiment of the invention. Referring to FIG. 4, simulation system 400 includes simulation module 313 having simulation logic 411 and controlling error calculator 412. When a planning module generate a route, route information 401 of the route and the vehicle profile information 321 are provided to simulation module 313. In one embodiment, based on the vehicle profile 321 and route information 401, simulation logic 411 performs a simulation using simulation method or model 325 to generate simulated route 402. Controlling error calculator 412 compares simulated route 402 and planned route 401 to determine controlling error 403. Process 400 may be iteratively performed for each of the planned routes provided by the planning module. One of the planned routes may be selected that has the minimum controlling error.

Figure 5:
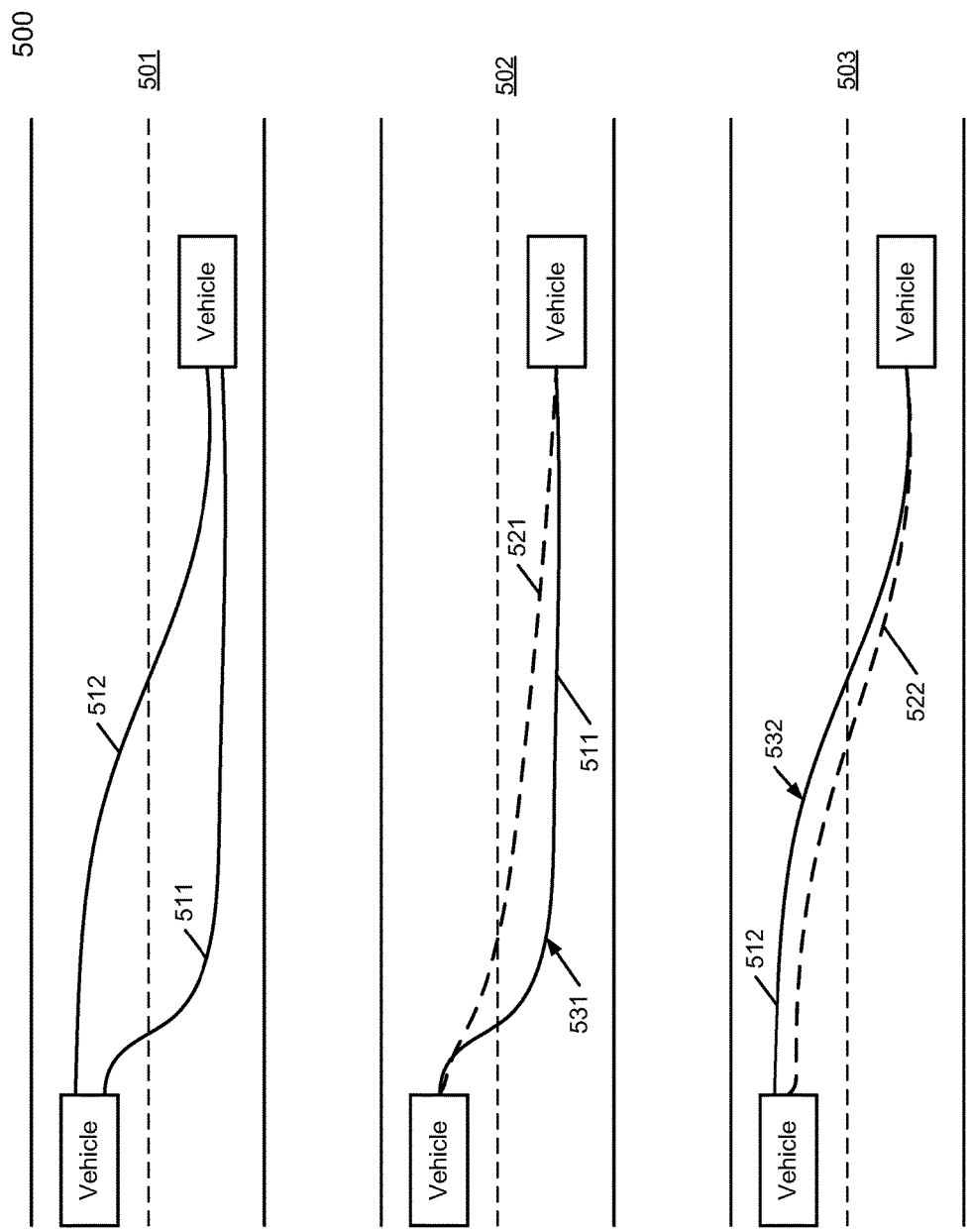
FIG. 5 is a diagram illustrating examples of planned routes in view of a simulated route for route selection according to one embodiment of the invention.

FIG. 5 is a diagram illustrating examples of planned routes in view of a simulated route for route selection according to one embodiment of the invention. Referring to FIG. 5, in this example, at processing stage 501, first planned route 511 and second planned route 512 have been generated by planning module 301. At processing stage 502, first simulated route 521 is generated based on a simulation performed on the planning and control data associated with first planned route 511 and a vehicle profile of the vehicle. At processing stage 503, second simulated route 522 is generated based on a simulation performed on the planning and control data associated with second planned route 512 and the vehicle profile of the vehicle.

Simulated route 521 is compared with planned route 511 to determine a first controlling error representing the difference or discrepancy between routes 511 and 521. In one embodiment, the graphs of routes 511 and 521 are plotted and the differences between data points of the graphs are determined at different points in time. The largest difference, in this example, at point 531, is utilized as the first controlling error associated with route 511. Similarly, simulated route 522 is compared with planned route 512 to determine second controlling error 532 associated with second planned route 512. In this example, the first controlling error represented at point 531 is larger than the second controlling error represented at point 532. As a result, planned route 512 will be selected for operating the vehicle.

Figure 6:
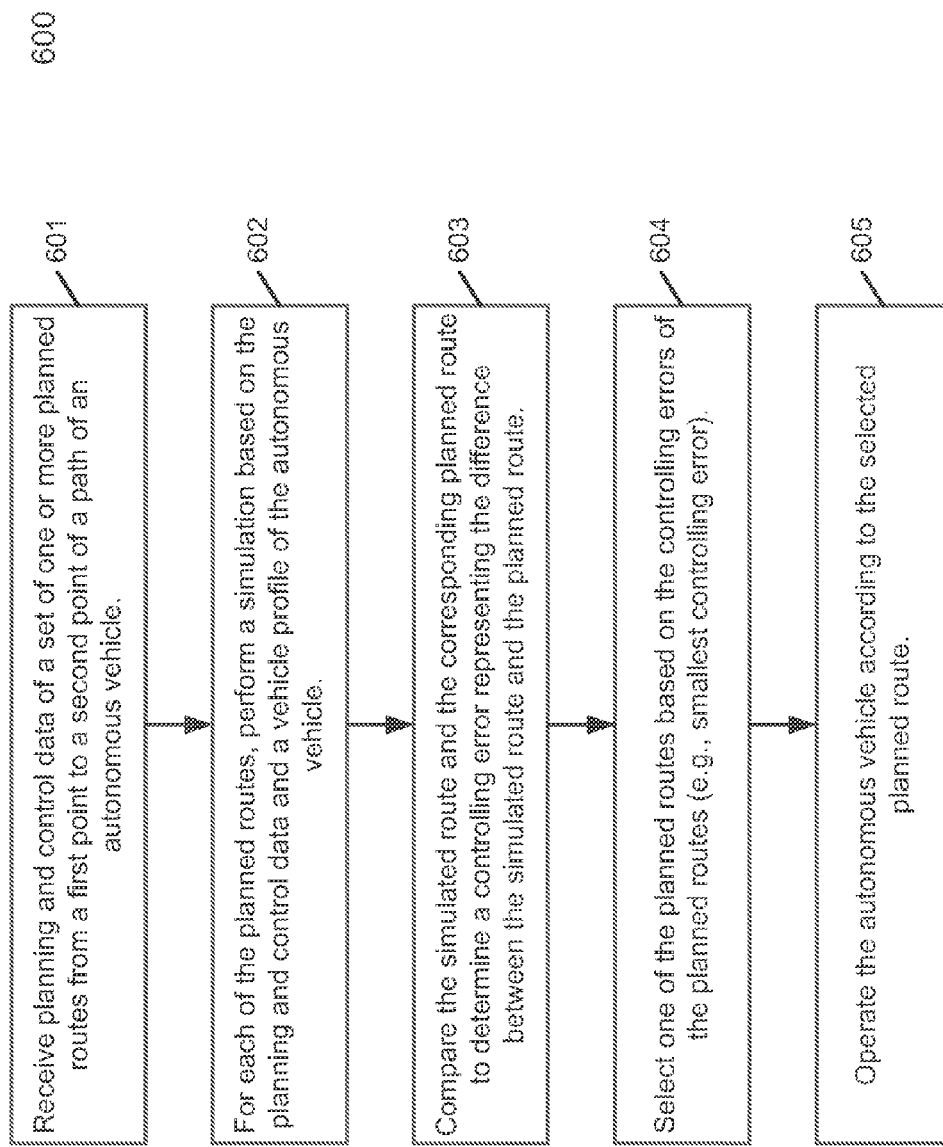
FIG. 6 is flow diagram illustrating a process of operating an autonomous vehicle according to one embodiment of the invention.
Figure 7:
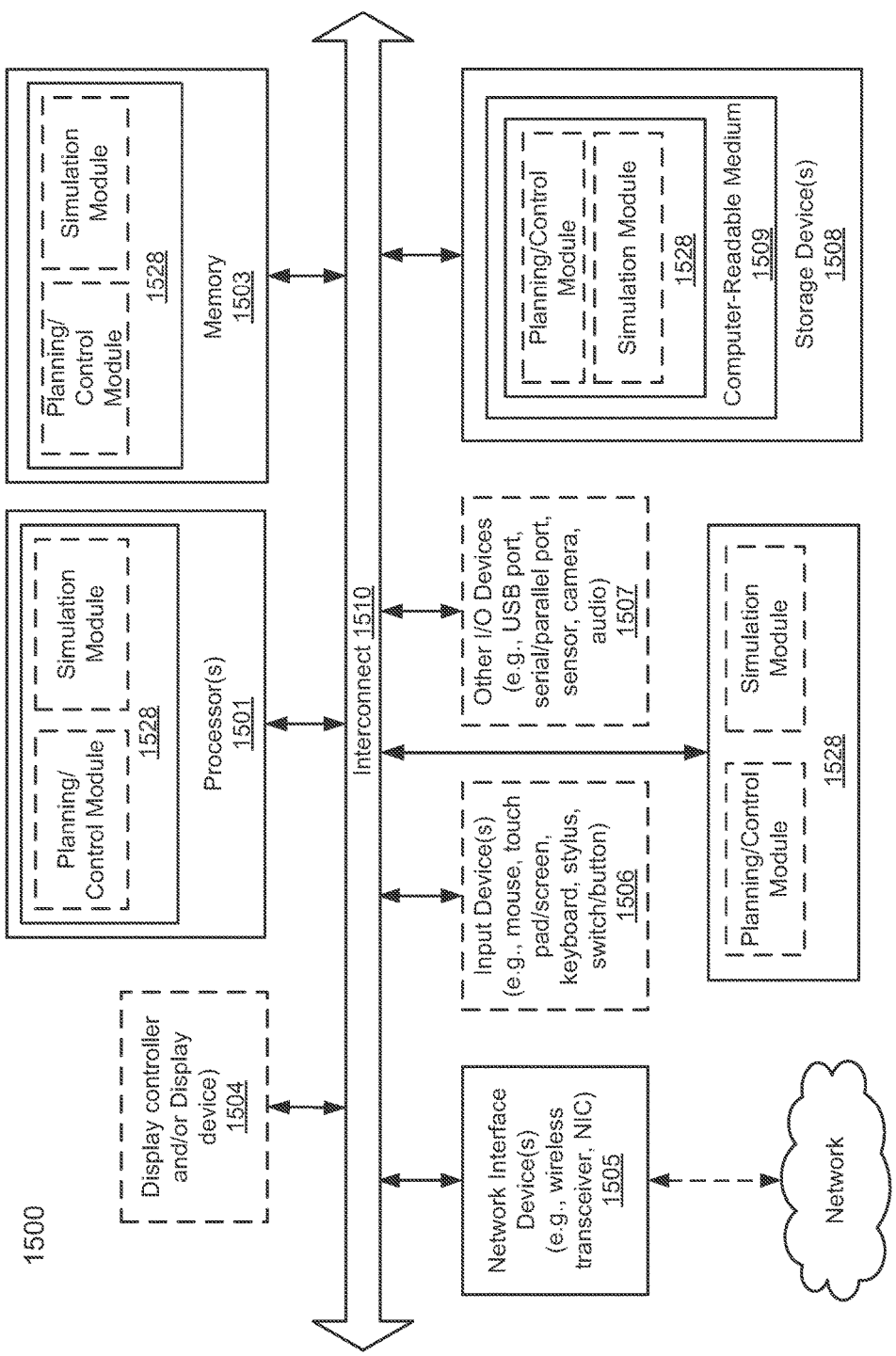
FIG. 7 is a block diagram illustrating a data processing system according to one embodiment.

FIG. 6 is flow diagram illustrating a process of operating an autonomous vehicle according to one embodiment of the invention. Process 600 may be performed by processing logic which may include software, hardware, or a combination thereof. For example, process 600 may be performed by system 300 of FIG. 3. Referring to FIG. 6, at block 601, processing logic receives planning and control data of a set of one or more planned routes from a first point to a second point of a path associated with an autonomous vehicle. For each of the planned routes, processing logic performs a simulation on the corresponding planning and control data of the route and a vehicle profile of the autonomous vehicle to generate a simulated route. At block 603, processing logic compares the simulated route and the planned route to determine a controlling error representing a difference between the simulated route and the planned route. At block 604, one of the planned routes is selected based on the controlling errors of the planned routes. The selected planned route has the least or smallest controlling error amongst the planned routes. At block 605, the autonomous vehicle is operated according to the selected planned route.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 6 is a block diagram illustrating an example of a data processing system which may be used with one embodiment of the invention. For example, system 1500 may represents any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
   receiving motion planning and control data indicating that an autonomous vehicle is to move from a first point to a second point of a path, the motion planning and control data describing a plurality of routes from the first point to the second point within the path;
   for each of the routes,
      performing a simulation of the route in view of physical characteristics of the autonomous vehicle to generate a simulated route, and
      computing a controlling error representing a discrepancy between the route and the simulated route;
   selecting one of the routes based on controlling errors between the routes and associated simulated routes; and
   operating the autonomous vehicle moving from the first point to the second point according to the selected route.

2. The method of claim 1, wherein the selected route has a minimum controlling error amongst the controlling errors of the routes.

3. The method of claim 1, wherein the physical characteristics of the autonomous vehicle are obtained from a vehicle profile that was compiled specifically for an identical model of the autonomous vehicle.

4. The method of claim 3, wherein the physical characteristics of the autonomous vehicle comprises a turning radius of the autonomous vehicle.

5. The method of claim 1, wherein computing a controlling error representing a discrepancy between a route and a simulated route comprises:
   plotting a first curve based on route metadata of the route;
   plotting a second curve based on simulation metadata of the simulated route;

locating a point in time at which there is a maximum difference between the first curve and the second curve; and calculating a distance of the maximum difference to represent a controlling error.

6. A non-transitory machine-readable medium having instructions stored therein, which when executed by a processor, cause the processor to perform operations of operating an autonomous vehicle, the operations including receiving motion planning and control data indicating that an autonomous vehicle is to move from a first point to a second point of a path, the motion planning and control data describing a plurality of routes from the first point to the second point within the path;

for each of the routes, performing a simulation of the route in view of physical characteristics of the autonomous vehicle to generate a simulated route, and computing a controlling error representing a discrepancy between the route and the simulated route;

selecting one of the routes based on controlling errors between the routes and associated simulated routes; and operating the autonomous vehicle moving from the first point to the second point according to the selected route.

7. The machine-readable medium of claim 6, wherein the selected route has a minimum controlling error amongst the controlling errors of the routes.

8. The machine-readable medium of claim 6, wherein the physical characteristics of the autonomous vehicle are obtained from a vehicle profile that was compiled specifically for an identical model of the autonomous vehicle.

9. The machine-readable medium of claim 8, wherein the physical characteristics of the autonomous vehicle comprises a turning radius of the autonomous vehicle.

10. The machine-readable medium of claim 6, wherein computing a controlling error representing a discrepancy between a route and a simulated route comprises:

plotting a first curve based on route metadata of the route;

plotting a second curve based on simulation metadata of the simulated route;

locating a point in time at which there is a maximum difference between the first curve and the second curve; and calculating a distance of the maximum difference to represent a controlling error.

11. A data processing system, comprising:

a processor; and a memory coupled to the processor for storing instructions, which when executed by the processor, cause the processor to perform operations of operating an autonomous vehicle, the operations including receiving motion planning and control data indicating that an autonomous vehicle is to move from a first point to a second point of a path, the motion planning and control data describing a plurality of routes from the first point to the second point within the path, for each of the routes, performing a simulation of the route in view of physical characteristics of the autonomous vehicle to generate a simulated route, and computing a controlling error representing a discrepancy between the route and the simulated route, selecting one of the routes based on controlling errors between the routes and associated simulated routes, and operating the autonomous vehicle moving from the first point to the second point according to the selected route.

12. The system of claim 11, wherein the selected route has a minimum controlling error amongst the controlling errors of the routes.

13. The system of claim 11, wherein the physical characteristics of the autonomous vehicle are obtained from a vehicle profile that was compiled specifically for an identical model of the autonomous vehicle.

14. The system of claim 13, wherein the physical characteristics of the autonomous vehicle comprises a turning radius of the autonomous vehicle.

15. The system of claim 11, wherein computing a controlling error representing a discrepancy between a route and a simulated route comprises:

plotting a first curve based on route metadata of the route;

plotting a second curve based on simulation metadata of the simulated route;

locating a point in time at which there is a maximum difference between the first curve and the second curve; and calculating a distance of the maximum difference to represent a controlling error.

* * * * *